United States Patent
Deng et al.

(10) Patent No.: US 11,768,607 B1
(45) Date of Patent: Sep. 26, 2023

(54) FLASH CONTROLLER FOR ASIC AND CONTROL METHOD THEREFOR

(71) Applicant: Chipintelli Technology Co., Ltd, Chengdu (CN)

(72) Inventors: Jian Deng, Chengdu (CN); Wei Tian, Chengdu (CN)

(73) Assignee: CHIPINTELLI TECHNOLOGY CO., LTD, Cheungdu (CN)

( * ) Notice: Subject to any disclaimer, the term of this patent is extended or adjusted under 35 U.S.C. 154(b) by 0 days.

(21) Appl. No.: 18/181,198

(22) Filed: Mar. 9, 2023

(30) Foreign Application Priority Data

Mar. 31, 2022 (CN) .......................... 202210328975.1

(51) Int. Cl.
*G06F 3/06* (2006.01)
*G06F 1/08* (2006.01)

(52) U.S. Cl.
CPC .............. *G06F 3/0613* (2013.01); *G06F 1/08* (2013.01); *G06F 3/0634* (2013.01); *G06F 3/0679* (2013.01)

(58) Field of Classification Search
CPC ........ G06F 3/0613; G06F 1/08; G06F 3/0679; G06F 3/0634
See application file for complete search history.

(56) References Cited

U.S. PATENT DOCUMENTS

| 11,050,427 | B1* | 6/2021 | Yao ........................ H03K 21/10 |
| 2016/0188223 | A1* | 6/2016 | Camp .................. G06F 3/0653 711/103 |
| 2020/0285465 | A1* | 9/2020 | Yang ..................... G06F 21/602 |
| 2022/0189520 | A1* | 6/2022 | Koizumi ................ G11C 16/10 |

FOREIGN PATENT DOCUMENTS

CN 109669888 A 4/2019

OTHER PUBLICATIONS

Jun. 8, 2022 Notice to Grant issued in Chinese Patent Application No. 202210328975.1.

* cited by examiner

*Primary Examiner* — Mark A Giardino, Jr.
(74) *Attorney, Agent, or Firm* — Oliff PLC

(57) ABSTRACT

A FLASH controller includes a main control module; and an arbitration module, a read data fifo, and a write data fifo connected with the main control module. The read data fifo and the write data fifo are both connected with the arbitration module and a data interface module, and the data interface module is connected with an AHB data bus. The controller further includes a register module that is connected with the read data fifo, the write data fifo, the arbitration module, and a configuration interface module. The configuration interface module is connected with an AHB configuration bus, and the main control module is connected with the register module through a synchronization module. The AHB data bus interface and the AHB configuration bus interface are adopted for different operations, and general read-write operations of FLASH are realized through DMA data transfer and high-capacity internal cache units, improving data transfer efficiency.

5 Claims, 4 Drawing Sheets

FLASH CONTROLLER FOR ASIC AND CONTROL METHOD THEREFOR

FIELD OF THE INVENTION

The invention belongs to the technical field of integrated circuits, and particularly relates to a FLASH controller for ASIC and a control method therefor.

BACKGROUND OF THE INVENTION

With the rapid development of FLASH technologies, an increasing number of devices can support the double transfer rate of clock signals, namely double transfer rate abbreviated for DTR. The transfer rate of FLASH based on DTR is twice that of FLASH based on single transfer rate. At present, the maximum transfer rate of SPI NOR FLASH devices launched under the DTR mode have reached 200 MHz. In relatively low-frequency logic on-chip storage applications, NOR FLASH devices can provide high data transfer rates with a small number of interfaces and support the "execute in place" mode, namely eXecute In Place abbreviated for XIP.

China patent, with the application number of 201811314760.4 and the title of Configurable and Efficiently Embedded Nor-FLASH Controller and Control Method Therefor, proposes a control method for improving the write rate of FLASH data through high-capacity caching and automatic erasing of Nor-FLASH data. However, the method has just a limited increase of data read and write bandwidths, so that FLASH devices with high performance cannot exert themselves to the best.

China patent, with the application number of 201610934188.6 and the title of Method and Device for Receiving Data Based on Serial FLASH Controller, proposes a method, in which two independent clocks, a working clock as the clock of the FLASH device, and a higher-frequency clock as the sample clock of return data of the FLASH device, are introduced; and the serial data signal returned by FLASH is delayed to improve the transfer rate of FLASH data. However, these two clocks will also increase the metastable state after the signal crosses a clock domain. Meanwhile, when a FLASH controller controls two FLASH chips to transfer data with large bandwidth, an eight-line Octal SPI is generally needed to transfer data, and the eight data lines must be be delayed, which increases the area and power consumption of logic units.

SUMMARY OF THE INVENTION

To overcome the technical disadvantages in the prior art, the invention discloses a DTR-FLASH controller for ASIC and a control method therefor.

The FLASH controller for ASIC according to the invention includes a main control module, and an arbitration module, a read data fifo, and a write data fifo connected with the main control module, where the read data fifo and the write data fifo are both connected with the arbitration module and a data interface module, and the data interface module is connected with an AHB data bus.

The FLASH controller further includes a register module, where the register module is connected with the read data fifo, the write data fifo, the arbitration module, and a configuration interface module; the configuration interface module is connected with an AHB configuration bus; the main control module is connected with the register module through a synchronization module.

The main control module includes a data transmitter sub-module used to send FLASH data information, a data receiver sub-module used to acquire data from a FLASH interface, and a clock generator sub-module for clock generation.

Preferably, the clock generator sub-module includes a TX clock generation branch, and the generated TX clock is used as the working clock of a FLASH device.

The TX clock generation branch includes a first frequency division module and a first clock bypass selector connected with the output end of the frequency division module, and the first clock bypass selector is further connected with the TX clock gating module.

Preferably, the clock generator sub-module further includes an RX clock generation branch, and the generated RX clock is used as an internal data acquisition clock.

The RX clock generation branch includes a second frequency division module and a first phase shift selector connected with the output end of the second frequency division module.

The RX clock generation branch further includes an inverter and a third frequency division module connected with the output end of the inverter, and the output end of the third frequency division module is connected with the first phase shift selector.

The RX clock generation branch further includes a first RX clock gating module and a second RX clock gating module, and the output ends of the first RX clock gating module and the second RX clock gating module are connected with a second phase shift selector; and the output ends of the first phase shift selector and the second phase shift selector are connected with a second clock bypass selector, where the phase difference between the output signals of the first RX clock gating module and the second RX clock gating module is a master clock period.

The invention further discloses a control method for the FLASH controller for ASIC, including a of the arbitration module, where the a of the arbitration module includes the following three modes:

Mode M4:

When a register is configured as a FLASH XIP mode, the arbitration module enters an idle state of the XIP mode.

If judging that the register is configured for a read operation of FLASH XIP, the arbitration module sends out an active handshaking signal of XIP read operation and enters the XIP read state; a system reads back data corresponding to an address from a read data fifo, and enters the XIP handshaking slave state after the handshake return signal is sent out by the main control module.

If judging that the register is not configured for a read operation of FLASH XIP, the arbitration module remains in the idle state of the XIP mode.

Mode M5: when a register is configured as a FLASH XIP read-ahead mode, the arbitration module enters the idle state of the XIP mode.

If judging that the register is configured for a read-ahead operation of FLASH XIP, the arbitration module sends out an active handshaking signal of XIP read-ahead operation and enters the XIP read-ahead state; a system reads back data from a read data fifo, the controller reads back data corresponding to subsequent addresses from a FLASH device into the read data fifo, and the arbitration module enters the idle state of XIP read-ahead to wait for the next reading of XIP after XIP read-ahead.

The arbitration module judges whether the address transferred by the next read operation of XIP matches with current data, and returns the corresponding data in the read data fifo if the current data matches with the address;

If the current data does matches with the address, the arbitration module enters the address jumping state of XIP, discards the current data, and judges whether next read-ahead data in the read data fifo matches with the current address; if the read-ahead data does not match with the current address, the arbitration module discards unmatched data until the data is read as matching with the current address; if a transfer address exceeds a read-ahead address judging range, the arbitration module re-reads data from FLASH with the transferred address.

If judging that the register is not configured for a write operation of FLASH XIP, the arbitration module remains in the idle state of the XIP mode.

Mode M6: when a register is configured as a FLASH XIP mode, the arbitration module enters the idle state of the XIP mode; if judging that the register is configured for a write operation of FLASH XIP, the arbitration module sends out an active handshaking signal of XIP write operation, and enters the XIP write state; a system saves data into the write data fifo and enters the XIP handshaking slave state after the main control module writes data corresponding to an address and receives a handshaking return signal.

If judging that the register is not configured for a write operation of FLASH XIP, the arbitration module remains in the idle state of the XIP mode.

The control method further includes a controlling mode of the main control module, where the controlling mode of the main control module includes the following two modes: after receiving the active handshaking signal from the arbitration module, the main control module enters the handshaking slave state 1 from the idle state, returns to the handshaking response signal of the arbitration module, and then terminates a handshaking process.

The main control module initiates an active handshaking request to the arbitration module, and enters the handshaking master state from the high chip selection state; after receiving the handshaking request, the arbitration module sends out the handshaking response signal, and the main control module receives the handshaking response signal and terminates the handshaking process.

Preferably, after the main control module terminates the handshake process, a subsequent control mode further includes the following modes:

Main control mode 1: after realizing data synchronization in the handshaking process, the FLASH device starts to work;

Main control mode 2: according to transfer configuration, command data information is converted into an SPI timing interface signal sent in a command period;

Main control mode 3: according to transfer configuration, address data information is converted into an SPI timing interface signal sent in an address period;

Main control mode 4: according to transfer configuration, extended byte data information is converted into an SPI timing interface signal sent in an extended byte period;

Main control model 5: according to transfer configuration, virtual bit data information is converted into an SPI timing interface signal sent in a virtual bit period;

Main control mode 6: according to transfer configuration, read data information is converted into an SPI timing interface signal sent in the read data state;

Main control mode 7: according to transfer configuration, write data information is converted into an SPI timing interface signal sent in the write data state;

Main control mode 8: in the read data state, if cache data received by the main control module from the FLASH device triggers a full threshold in the pre-configured fifo, it indicates further cache data will result in loss of some data; the main control module enters to wait for the FIFO ready state, and continues to send a new SPI instruction after FIFO cache data is ready;

Main control mode 9: after waiting for the FIFO ready state, the main control module enters the handshaking slave state 2 to synchronize new data and empty invalid data in the fifo if a new configuration transfer request is made; and Main control mode 10: after realizing data transfer, the FLASH device stops operating and terminates FLASH operation; and Main control mode 11: after handshaking, the main control module enters the idle state and waits for a new operation instruction.

Preferably, the working mode of the arbitration module further includes the following three modes:

Mode M1: when the register is configured as a normal FLASH configuration mode, the arbitration module enters the idle state of a general configuration mode, sends out the active handshaking signal, and enters the general handshaking slave state after the main control module sends configured data and receives the handshaking return signal;

Mode M2: when the register is configured as a normal FLASH configuration mode, the arbitration module enters the idle state of a general data mode; if judging that the register is configured for a read operation of FLASH, the arbitration module sends out an active handshaking signal of read operation, enters the general read state, and waits for the system to read data into a data interface bus in the read data fifo;

After the main control module reads data in the FLASH device and receives the handshaking return signal, the arbitration module enters the general handshaking slave state; if judging that the register is not configured for a general read operation of FLASH, the arbitration module remains in the idle state of the general data mode;

Mode M3: when the register is configured as a normal FLASH configuration mode, the arbitration module enters the idle state of the general data mode; if judging the register is configured for a write operation of FLASH, the arbitration module sends out an active handshaking signal of write operation, enters the general write state, and waits for the system to save data into the write data fifo;

After the main control module writes data and receives the handshaking return signal, the arbitration module enters the general handshaking slave state; if judging that the register is not configured for a general write operation of FLASH, the arbitration module remains in the idle state of the general data mode.

According to the invention, an AHB data bus interface and an AHB configuration bus interface are correspondingly adopted for different operations to control large-bandwidth data flow of FLASH using two chip selection signals, and general read-write operations of FLASH are realized through DMA data transfer and high-capacity internal cache units, thereby simplifying the operation procedure of the controller and improving data transfer efficiency.

With the utilization of flexible timing adjustment design in the invention, the area and power consumption of the controller are reduced and sufficient timing margin is reserved, thereby reducing the workload during the implementation of digital back ends and shortening a project period. The adjustable timing improves the stability of chips in complex environment.

In the invention, the data bandwidth in an SPI single-line mode is ≤166 Mbit/s; the data bandwidth in an SPI octal (8-line) mode is ≤166 Mbyte/s; and the data bandwidth in a DTR mode is ≤400 Mbyte/s.

Figure 3:
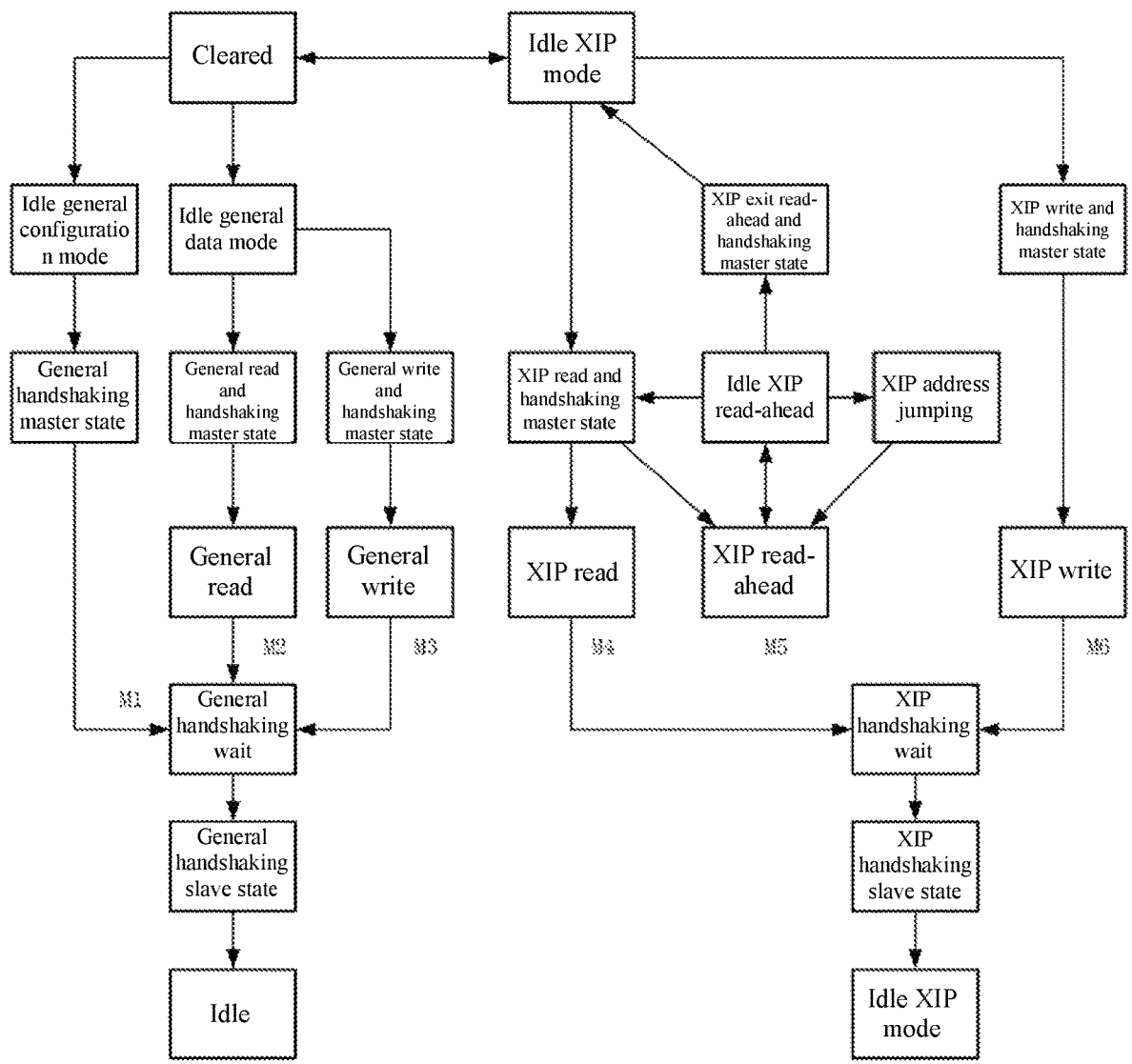
FIG. 3 is a schematic diagram of a specific implementation mode of an arbitration state diagram of the arbitration module according to the invention.
Figure 4:
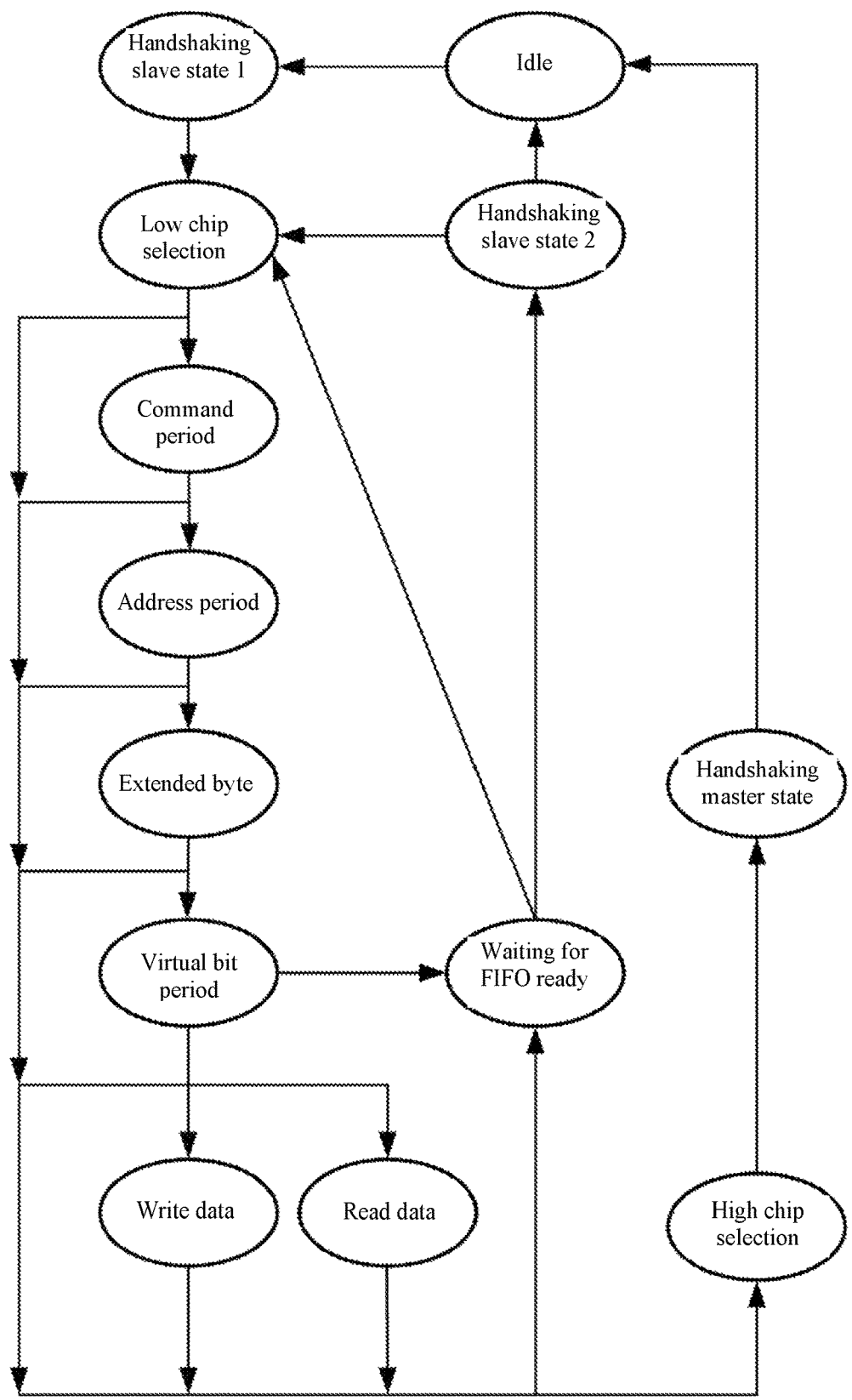
Figure 5:
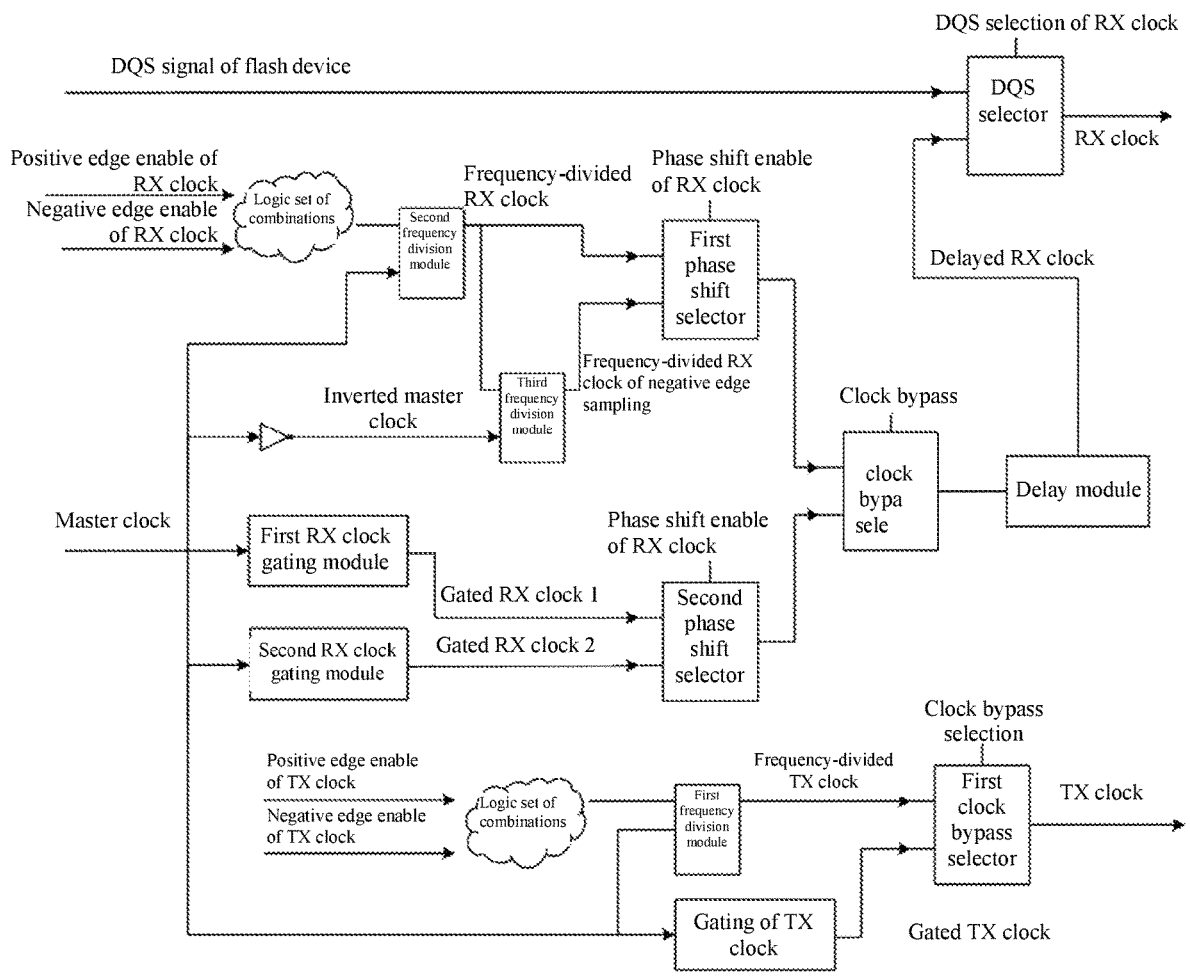

M1-M6 in FIG. 3 represents different working modes;

FIG. 4 is a schematic diagram of a specific implementation mode of a state diagram of the main control module according to the invention; and FIG. 5 is a schematic diagram of a specific implementation mode of the clock generation module according to the invention.

DETAILED DESCRIPTION OF THE PREFERRED EMBODIMENTS

The embodiments of the invention are further described in the following.

Figure 1:
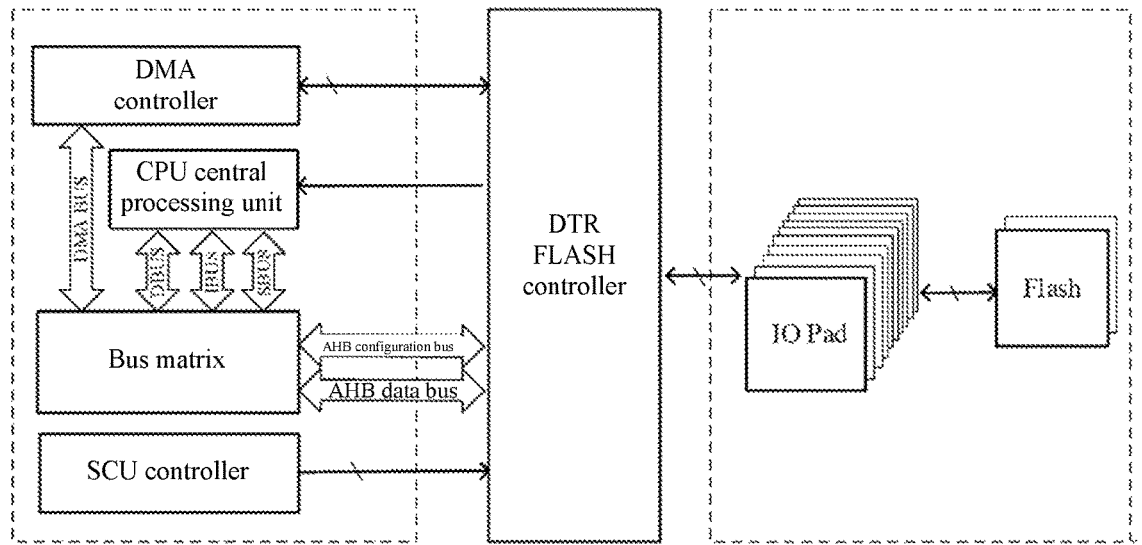
FIG. 1 is a schematic diagram of a typical application scenario of the FLASH controller according to the invention.

A typical application scenario of the FLASH controller according to the invention is as shown in FIG. 1.

In FIG. 1, the FLASH controller is a DTR (Double Transfer Rate) FLASH controller, which is connected with a bus matrix through an AHB (Advanced High-performance Bus) data bus and an AHB configuration bus; and the bus matrix is connected with a DMA controller through an AHB bus of direct memory access (DMA), and further connected with a central processing unit CPU through a data bus DBUS, an instruction bus IBUS, and a system bus SBUS. A CPU core realizes instruction acquisition through IBUS, data loading and access through DBUS, and peripheral access through SBUS.

The DMA controller in FIG. 1 is used for direct transfer of save data; an SCU controller provides the clock and reset signal required for the DTR FLASH controller; the bus matrix provides access arbitration management for a DMA controller bus, three buses of the central processing unit CPU, and a DTR FLASH controller bus. A port IOPAD is used for interface management of input and output pins of FLASH devices.

The FLASH controller is characterized in that an AHB data bus interface and an AHB configuration bus interface are correspondingly adopted for different operations.

When a large number of data need to be transferred, the AHB data bus interface is used. When controller configuration instructions and FLASH instructions are transferred, the AHB configuration bus interface is used. Therefore, the controller controls large-bandwidth data flow of FLASH through two chip selection signals and can be provided with multiple SPI interfaces: single-line SPI, double-line SPI, four-line SPI, eight-line SPI, single transfer rate and double transfer rate (DTR), which is compatible with various command operations of FLASH. Furthermore, SPI is a serial peripheral interface.

General read-write operations of FLASH are realized through DMA data transfer and high-capacity internal cache units, thereby simplifying the operation procedure of the controller and improving data transfer efficiency.

The AHB data bus interface is used to parse read-write signals, read-write addresses, and data length information of an AHB bus protocol to realize XIP operation, and a data read-ahead mode can be set. When the read-ahead mode is enabled, the controller reads data in a FLASH device in advance according to the data address and judges whether the next address received is within a read-ahead range. If the above address is within the range, the controller directly returns data saved at the corresponding address, thereby improving data read performance. The system can be started in the FLASH device through the default configuration of the "execute in place" mode.

The FLASH controller according to the invention can support PSRAMs of SPI, Quad SPI (four-line SPI interface), Octal SPI (eight-line SPI interface), and other interfaces to realize write operation of XIP when FLASH is a phesduo random access memory (PSRAM). AHB bus protocol signals are used to parse read-write signals, read-write addresses, and data length information to realize write of XIP, compatible with various command operations of PSRAM.

The built-in clock generation module of the FLASH controller according to the invention generates clocks internally, facilitating flexible adjustment of timing: the clock generation module supports configuration of multiple clock frequency points and can be configured to input frequency division of 1/2/4/6/8 of a master clock; and a data receiving clock RX performs clock phase adjustment.

Figure 2:
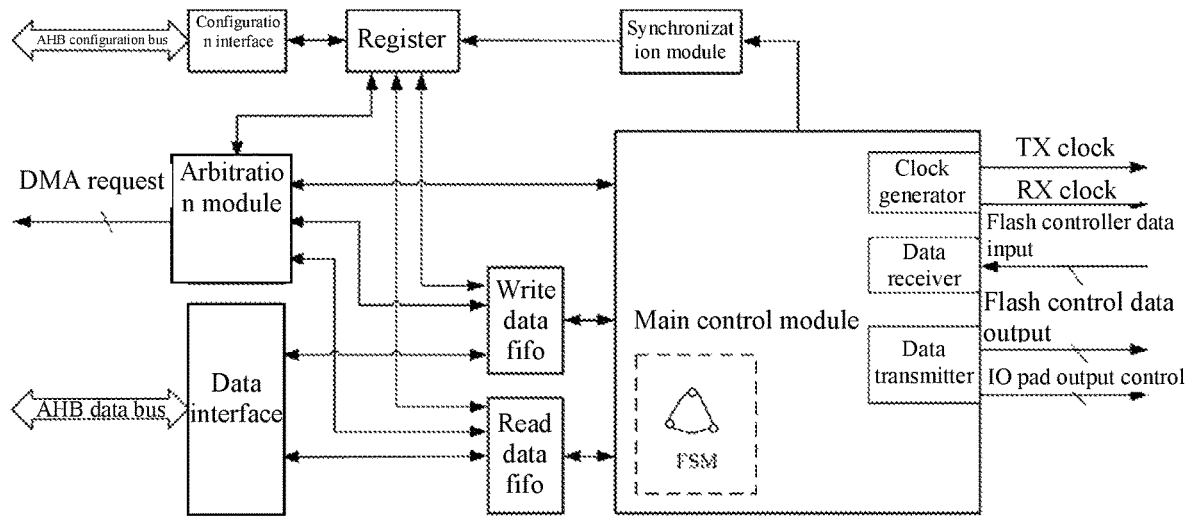
FIG. 2 is a schematic diagram of a specific embodiment of an internal design architecture of the FLASH controller according to the invention.

An internal design architecture of the FLASH controller according to the invention is as shown in FIG. 2.

The FLASH controller includes a main control module, and an arbitration module, a read data fifo, and a write data fifo connected with the main control module, where the read data fifo and the write data fifo are both connected with the arbitration module and a data interface module, and the data interface module is connected with an AHB data bus.

The FLASH controller further includes a register module, where the register module is connected with the read data fifo, the write data fifo, the arbitration module, and a configuration interface module; the configuration interface module is connected with an AHB configuration bus; the main control module is connected with the register module through a synchronization module; and The main control module includes a data transmitter sub-module used to send FLASH data information and support phase adjustment of sending data, a data receiver sub-module used to acquire data from a FLASH interface, and a clock generator sub-module for clock generation.

A register module is mainly used to save the relevant parameters and current state of the FLASH controller. The module can send the configuration information of the controller from the bus to a corresponding module and collects information of each sub-module to generate state and interruption information.

A configuration interface module is the bus interface of the register module and mainly used for reading and writing controller parameters. The module is an AHB slave interface and docked with an AHB master interface of an external bus matrix, which can convert AHB signals into read-write enable signals to interact with the register module.

A data interface module is an AHB data transfer interface and used for transfer of data flow. The module can read FLASH data cached in the read data fifo (FIFO register) into the bus matrix or cache data transferred from the bus matrix into the write data fifo. Meanwhile, it can send the read-write addresses and the data length information to the arbitration module.

The arbitration module judges the current transfer mode and determines the current operation according to data transferred by the data interface module and the configuration interface module: sending the corresponding transfer mode and the corresponding address and data length information to the main control module. When DMA is used for performing a read-write operation, the arbitration module generates a DMA transfer request signal, and can transfer data in single transfer or burst burst transfer mode of AHB.

The main control module mainly fits with a FLASH interface protocol, controls read-write data cache through a state machine, and flexibly configures data receiving and transferring formats and the interface timing of the FLASH device, as shown in FIG. 4. The main control module includes three sub-modules: a data transmitter sub-module used to send FLASH data information, a clock generator sub-module used to generate the TX clock of the FLASH device, and a data receiver sub-module used to sample the RX clock. A high-flexibility design is adopted in the clock generator sub-module, facilitating the timing adjustment of the RX clock. The data receiver sub-module can be configured to collect FLASH interface data according to different interface modes. The main control module can realize mode switch, address jumping, data preparation, and the like through state handshaking.

The write data fifo, the read data fifo, and the cache register built in the register module are usd to cache internal data. Data cache can be configured in two modes: 1. Register mode; 2. FIFO storage mode, in which a high-capacity write data FIFO cache unit can write data of a FLASH page at one time and improve the transmission rate of the data, with configurable trigger thresholds; furthermore, the cache unit is asynchronous FIFO.

A synchronization module is used to process an internal asynchronous clock domain signal crossing a clock domain.

As shown in FIG. 3, a specific implementation mode of the arbitration state diagram of the arbitration module according to the invention can generate at least six control modes as follows:

Mode M1: when the register is configured as a normal FLASH configuration mode, the arbitration module enters the idle state of a general configuration mode, sends out the active handshaking signal, and enters the general handshaking slave state after the main control module sends configured data and receives the handshaking return signal. This indicates sending of the configured data is realized. Mode M1 is mainly used for transferring a FLASH instruction instead of data. The cache register built in the register module can be configured to realize a read-write operation of single instruction. Instruction configuration is simple with quick response rate.

Mode M2: when the register is configured as a normal FLASH configuration mode, the arbitration module enters the idle state of a general data mode; if judging that the register is configured for a read operation of FLASH, the arbitration module sends out an active handshaking signal of read operation, enters the general read state, and waits for the system to read data into a data interface bus in the read data fifo.

After the main control module reads the configured data and receives its handshaking return signals, the arbitration module enters the general handshaking slave state, indicating that read data has been read. Mode M2 is mainly used in a scenario where a large amount of data is read from the FLASH device. The read data fifo is needed for data caching and DMA data transfer.

If judging that the register is not configured for a general read operation of FLASH, the arbitration module remains in the idle state of the general data mode;

Mode M3: when the register is configured as a normal FLASH configuration mode, the arbitration module enters the idle state of the general data mode; if judging the register is configured for a write operation of FLASH, the arbitration module sends out an active handshaking signal of write operation, enters the general write state, and waits for the system to save data into the write data fifo.

After the main control module sends the data written into FLASH and receives its handshaking return signals, the arbitration module enters the general handshaking slave state. This indicates that sending data has been written. Mode M3 is mainly used in a scenario where the data of the FLASH device is written. The write data fifo is needed for data caching and DMA data transfer. Usually, it takes milliseconds to write data in a page unit of FLASH, so the writing operation of FLASH often runs at a low working frequency.

If judging that the register is not configured for a general read operation of FLASH, the arbitration module remains in the idle state of the general data mode.

The invention also provides three working modes of "execute in place" (XIP).

Mode M4: when a register is configured as a FLASH XIP mode, the arbitration module enters the idle state of the XIP mode; if judging that the register is configured for a write operation of FLASH XIP, the arbitration module sends out an active handshaking signal of XIP write operation, and enters the XIP write state; and the system reads back data from the read data fifo through the bus, and enters the XIP handshaking slave state after the main control module reads FLASH data corresponding to an address and receives the handshake return signal, indicating the data corresponding to an address has been read back.

If judging that the register is not configured for a read operation of FLASH XIP, the arbitration module remains in the idle state of the XIP mode.

Mode M4 is mainly used in a scenario where the "execute in place" mode is adopted for data saved in FLASH. The read data fifo is needed for data caching and DMA data transfer. The system bus can execute programs in a FLASH chip, but has a specific timing overhead.

Mode M5: when a register is configured as a FLASH XIP read-ahead mode, the arbitration module enters the idle state of the XIP mode; if judging that the register is configured for a read-ahead operation of FLASH XIP, the arbitration module sends out an active handshaking signal of XIP read-ahead operation and enters the XIP read-ahead state; a system reads back data from a read data fifo, the controller reads back data corresponding to subsequent addresses from a FLASH device into the read data fifo, and the arbitration module enters the idle state of XIP read-ahead to wait for the next reading of XIP after XIP read-ahead. The arbitration module judges whether the address transferred by the next read operation of XIP matches with current data, and returns the corresponding data in the read data fifo if the current data matches with the address; if the current data does matches with the address, the arbitration module enters the address jumping state of XIP, discards the current data, and judges whether next read-ahead data in the read data fifo matches with the current address; if the read-ahead data does not match with the current address, the arbitration module discards unmatched data until the data is read as matching with the current address. If the transferred address is beyond the range of address judgement, it will be used for reading data of FLASH. When being in the idle state of the XIP read-ahead, the arbitration module exits the read-ahead mode, enters the handshaking master state of XIP exit read-ahead, and returns to the idle state of the XIP mode. When waiting for the handshaking state in the mode of XIP, the arbitration module receives the handshaking return signal and enters the handshaking slave state of XIP. This indicates that data has been read back.

If judging that the register is not configured for a read operation of FLASH XIP, the arbitration module remains in the idle state of the XIP mode.

Mode M5 is mainly used in a high-performance scenario where data saved in FLASH can be quickly read. The read data fifo is needed for data caching and DMA data transfer. Upon startup of read-ahead, the system bus can greatly reduce the timing overhead during data reading, thereby improving the data reading rate.

Mode M6: when FLASH connected with the controller is a PSRAM device, a register can be configured as an XIP write mode. When the register is configured as a FLASH XIP mode, the arbitration module enters the idle state of the XIP mode; if judging that the register is configured for a write operation of FLASH XIP, the arbitration module sends out an active handshaking signal of XIP write operation, and enters the XIP write state; a system saves data into the write data fifo and enters the XIP handshaking slave state after the main control module writes data corresponding to an address and receives a handshaking return signal. This indicates that the data corresponding to an address has been written.

If judging that the register is not configured for a write operation of FLASH XIP, the arbitration module remains in the idle state of the XIP mode.

Mode M6 is mainly used in a scenario where the PSRAM device is used and data is written at a high rate. As the programming time of the FLASH device is relatively long, data can be directly and quickly written using the PSRAM device, which simplifies the operation procedure.

In various modes, the idle state of the XIP mode indicates that the arbitration module has entered the working state of XIP according to the configuration of CPU, but has not started data transfer. The handshaking slave state of XIP indicates that the arbitration module is shaking hands with the main control module, the main control module realizes data transfer in the working mode of XIP and initiates the active handshaking signal to the arbitration module, notifying the arbitration module that data transfer is terminated. The general handshaking slave state indicates the same.

In various modes, the configuration mode of the register depends on commands sent by CPU, and the configuration is realized by the register module.

A control state diagram of the main control module according to the invention is as shown in FIG. 4. A handshaking process established between the main control module and the arbitration module includes two typical control modes as follows:

After arbitrating the working mode according to the configuration information sent by CPU, the arbitration module enters the active handshaking state, sends specific working information to the main control module to realize the specific operation of the FLASH device. After receiving the active handshaking signal from the arbitration module, the main control module enters the handshaking slave state 1 from the idle state, returns to the handshaking response signal of the arbitration module, and then terminates a handshaking process.

Alternatively, the main control module initiates an active handshaking request to the arbitration module; after receiving the handshaking request, the arbitration module sends out the handshaking response signal; and the main control receives the handshaking response signal and exits the handshaking process.

In the invention, the arbitration module and the main control module cooperatively control mode switching through handshaking, which can efficiently synchronize data between different modules without any data conflicts. New instructions are obtained through handshaking, thereby ensuring the correctness of ongoing data transfer and avoiding data conflicts and system crashes caused by illegal operations.

A handshaking coordination process is that the arbitration module and the main control module are in the preparation and termination stages of data transfer. After the arbitration module sends out the active handshaking signal, the receiving module enters the handshaking slave state in the idle state, terminates the handshaking process, and performs data transfer.

For example, after the arbitration module in Mode M4 sends out the active handshaking signal of XIP read operation, the main control module receives the active handshaking signal from the arbitration module. At this case, if the main control module is in the idle state, it returns the handshaking response signal to terminate the handshaking process. If the main control module is in another state, it enters another main control state. For example, the main control module initiates an active handshaking signal; after receiving the active handshaking signal, the arbitration module enters the handshaking slave state of XIP when waiting for the handshaking state in the mode of XIP.

For example, when the arbitration module works during the read operation of XIP, CPU suddenly changes the working mode of the controller from the read operation of XIP to the read-ahead operation of XIP. However, if the arbitration module does not receive the active handshaking request initiated after the main control module realizes data transfer and returns to the idle state, it ignores the instruction to change the current working mode. After realizing data transfer, the main control module actively initiates a handshaking request to the arbitration module and returns to the idle state to wait for a new handshaking and receive a new instruction. Alternatively, when the main control module waits for the FIFO ready state and there is no data transfer between the controller and the flash device, the main control module receives a new instruction through a new handshaking. In other states and when the data of the flash device is transferred, the main control module does not enter the handshaking state to acquire a new instruction.

After the handshaking process is established between the main control module and the arbitration module, the subsequent operations depend on the specific work information, mainly including the following modes:

Main control mode 1: after realizing data synchronization in the handshaking process, the main control module enters a low chip selection state of FLASH. Generally, the FLASH device starts to work when a chip selection signal is at a low level.

Main control mode 2: according to transfer configuration, command data information is converted into an SPI timing interface signal sent in a command period. The length of command data transferred is configurable, and therefore such step can be skipped according to application requirements.

Main control mode 3: according to transfer configuration, address data information is converted into an SPI timing interface signal sent in an address period. The length of address data transferred is configurable, and therefore such step can be skipped according to application requirements.

Main control mode 4: according to transfer configuration, extended byte data information is converted into an SPI timing interface signal sent in an extended byte period. Such step can be skipped according to application requirements.

Main control model 5: according to transfer configuration, virtual bit data information is converted into an SPI timing interface signal sent in a virtual bit period. The length of virtual bit data period transferred is configurable, and therefore such step can be skipped according to application requirements.

Main control mode 6: according to transfer configuration, read data information is converted into an SPI timing interface signal sent in the read data state. The length of read data is configurable, and therefore such step can be skipped according to application requirements.

Main control mode 7: according to transfer configuration, write data information is converted into an SPI timing interface signal sent in the write data state. Such step can be skipped according to application requirements.

Main control modes of command periods, address periods, extended bytes, virtual bit periods, read data, write data, and the like as described in the main control mode 1 to the main control mode 7 can be skipped to satisfy different application scenarios. For example, the main control module works only in the instruction period or the instruction period and the address period.

Main control mode 8: in the read data state, if cache data received by the main control module from the FLASH device triggers a full threshold in the pre-configured fifo, it indicates further cache data will result in loss of some data; the main control module enters to wait for the FIFO ready state, and continues to send a new SPI instruction after FIFO cache data is ready.

Main control mode 9: after waiting for the FIFO ready state, the main control module enters the handshaking slave state 2 to synchronize new data and empty invalid data in the fifo if a new configuration transfer request is made.

Main control mode 10: after realizing data receiving and transfer, the main control module enters the high chip selection state, the FLASH device stops operating and terminates FLASH operation when a chip selection signal is at a high level.

Main control mode 11: the main control module initiates an active handshaking request to the arbitration module; after receiving the handshaking request, the arbitration module sends out the handshaking response signal, and the main control module receives the handshaking response signal and exits the handshaking process.

Main control mode 12: after handshaking, the main control module enters the idle state and waits for a new operation instruction.

A specific circuit structure of the clock generator sub-module according to the invention is as shown in FIG. 5, in which a master clock and multiple positive edge enable signals and negative edge enable signals are used to respectively generate a TX clock and an RX clock.

The clock generator sub-module includes a TX clock generation branch, where the TX clock generation branch includes a first frequency division module and a first clock bypass selector connected with the output end of the frequency division module, and the first clock bypass selector is further connected with the TX clock gating module.

In use, the master clock and the TX clock gating module are connected with the input end of the first frequency division module; and the input of the first frequency division module is controlled by the positive edge enable signals and negative edge enable signals externally input of the TX clock.

The clock generator sub-module generates the TX clock as the working clock of the FLASH device, and the TX clock can share the frequency with the master clock or divide the frequency of the master clock by 2, 4, 6 and 8. The generation process of the TX clock is as follows:

Step 1: the master clock input to the DTR FLASH controller is the working clock of the system, and the main control module generates the positive edge enable signals of the TX clock and the negative edge enable signals of the TX clock according to frequency dividing coefficients configured by CPU, and the positive edge enable signals and the negative edge enable signals respectively control the rising edges and falling edges of the TX clock after the frequency of the master clock is divided by 2, 4, 6, and 8. When the positive edge enable signals are valid and the negative edge enable signals are invalid, the TX clock is converted from a low level to a high level; when the positive edge enable signals are invalid and the negative edge enable signals are valid, the TX clock is converted from a high level to a low level.

Step 2: the master clock is gated by the TX clock gating module to obtain the gated TX clock. The function of the TX clock gating module is to generate a clock sharing the frequency with the master clock; the main control module generates a clock gating signal according to the current control state of FLASH data sending or receiving; when a working clock is required for FLASH, the TX clock gating module is opened and starts to output the clock; when FLASH stops operating, the TX clock gating module is closed and stops outputting the clock. The specific circuit of the gating control module is the prior art in the field, and will not be described herein.

Step 3: the gated TX clock and the frequency-divided TX clock are selected by the first clock bypass selector to obtain the TX clock, and the selection signal is a clock bypass selection signal.

The clock generator sub-module further generates the RX clock as an internal data acquisition clock. The RX clock can share the frequency with the master clock or divide the frequency of the master clock by 2, 4, 6, 8 and the like, and supports a configurable phase shift, such as an RX divide-by-eight clock generated based on the master clock, for which the RX clock can be shifted by 1-8 master clock periods. To be specific, the phase shift of the frequency division clock can reach the frequency dividing coefficient. In the frequency sharing mode, the phase adjustment is supported for only one master clock period.

The clock generator sub-module further includes an RX clock generation branch, where the RX clock generation branch includes a second frequency division module and a first phase shift selector connected with the output end of the second frequency division module.

the RX clock generation branch further includes an inverter and a third frequency division module connected with the output end of the inverter, and the output end of the third frequency division module is connected with the first phase shift selector;

The RX clock generation branch further includes a first RX clock gating module and a second RX clock gating module, and the output ends of the first RX clock gating module and the second RX clock gating module are connected with a second phase shift selector; and the output ends of the first phase shift selector and the second phase shift selector are connected with a second clock bypass selector. As the gating signals of the first RX clock gating module and the second RX clock gating module are different in terms of valid time, the phase difference between the output signals of the first RX clock gating module and the second RX clock gating module is a master clock period.

The output end of the second clock bypass selector is connected with a DQS selector through a delay module.

In use, the master clock is connected with the first RX clock gating module, the inverter of the second RX clock gating module, and the second frequency dividing module; and the main control module inputs the positive edge enable signal of the RX clock and the negative edge enable signal of the RX clock to control the second frequency dividing module. A DQS signal is input to the DQS selector. The data strobe output signal (DQS) of the FLASH device can accurately indicate each data transfer period, which is used to receive data accurately by a receiver.

A specific generation process of the RX clock is as follows:

Step 1: the positive edge enable signal of the RX clock and the negative edge enable signal of the RX clock control the rising edge and falling edge of the frequency division clock to obtain the frequency-divided RX clock, and are configured based on frequency dividing coefficients.

Step 2: the inverted master clock is obtained after the master clock passes through the inverter, and the inverted master clock samples the RX clock after frequency division to obtain the frequency-divided RX clock of the negative edge sampling with a phase offset of 90 degrees.

Step 3: after passing through the first phase shift selector controlled by the phase shift enable signal of the RX clock, the frequency-divided RX clock and the frequency-divided RX clock for sampling of the negative edge transfer the selected signals into the second clock bypass selector.

Step 4: after passing through two RX clock gating units, the master clock obtains two data sampling clocks with a phase difference of one cycle: gated RX clock 1 and gated RX clock 2.

Step 5: the gated RX clock 1 and the gated RX clock 2 pass through the second phase shift selector, and the selected clocks are transferred to the second clock bypass selector. The selection signal of the second clock bypass selector is the clock bypass selection signal.

Step 6: the signal selected by the second clock bypass selector is connected to the delay module for fine adjustment of clock delay, the fine adjustment level can be set to 1 to 32, and the delay time is different according to the performance of a standard unit (the delay time of a complementary metal oxide semiconductor is seriously influenced by processes, temperature and voltage). Generally, the delay of the first-level delay unit is picosecond, and the total delay of the 32nd-level delay unit is nanosecond, and the delayed RX clock is output.

Step 7: the delayed RX clock and the DQS signal of the FLASH device are transferred to the DQS selector, the selected RX clock is a data sampling clock, and the selection signal of the DQS selector is the DQS selection signal of the RX clock.

The DQS signal is a signal output by the FLASH device to the controller. The data strobe output signal (DQS) of the FLASH device can accurately indicate each data transfer period.

Single D trigger can be adopted for each frequency division module, and the phase shift selector and the clock bypass selector are the prior art in the field; in the invention, the clock generator sub-module generates the TX cock and the RX clock, the rising edge and falling edge of the TX clock can be used as the clock edge for data sending, and the rising edge and falling edge of the RX clock can be used as the clock edge for data sampling. The clocks are highly adjustable, and divided into three levels:

A first-level adjustment is a frequency division phase shift and has a wide timing adjustment range. The RX clock is generated through the frequency division of the master clock, and its rising edge can be adjusted in a frequency division range. For example, when the RX clock is a divide-by-eight clock, the starting time of the rising edge of the RX clock can be selected in the range from a first master clock period to an eighth master clock period.

A second-level adjustment is the edge adjustment of the sampling clock, in which the rising edge and the falling edge are selected for adjustment. For example, the rising edge of the frequency-divided RX clock is adjusted by 0-degree phase; the rising edge of the frequency-divided RX clock for sampling of the negative edge is adjusted by 90-degree phase; the falling edge of the frequency-divided RX clock is adjusted by 180-degree phase; the falling edge of the frequency-divided RX clock for sampling of the negative edge is adjusted by 270-degree phase; and the range of the second-level adjustment is the 90-degree phase of one master clock period.

A third-level adjustment is the delay adjustment of the delay module, has a small timing adjustment range, and is used for fine adjustment of the clock signal.

The above adjustments can make the design accurately sample data at room temperature and high and low temperature, improving the stability of chips. The provision of the adjustment clock leaves a large timing margin for back-end implementation steps, digital back-end personnel do not need to spend too much time and effort on the logic timing of the controller, thereby speeding up the project schedule.

The preferred embodiments of the invention are as previously mentioned. If the preferred implementations in the preferred embodiments are not obviously self-contradictory or based on a specific preferred implementation, they can be combined and used at will. The embodiments and the specific parameters therein are only for clearly stating the verification process of the inventor's invention, instead of limiting the patent protection scope of the invention. The patent protection scope of the invention is still subject to claims, and all equivalent structural changes made based on the specification and drawings of the invention should fall within the protection scope.

What is claimed is:

1. A FLASH controller for ASIC, comprising a main control module, and an arbitration module, a read data fifo, and a write data fifo connected with the main control module, wherein the read data fifo and the write data fifo are both connected with the arbitration module and a data interface module, and the data interface module is connected with an AHB data bus;

the FLASH controller further comprises a register module, wherein the register module is connected with the read data fifo, the write data fifo, the arbitration module, and a configuration interface module; the configuration interface module is connected with an AHB configuration bus; the main control module is connected with the register module through a synchronization module; and the main control module comprises a data transmitter sub-module used to send FLASH data information, a data receiver sub-module used to acquire data from a FLASH interface, and a clock generator sub-module for clock generation, wherein the clock generator sub-module comprises a TX clock generation branch, and the generated TX clock is used as the working clock of a FLASH device;

the TX clock generation branch comprises a first frequency division module and a first clock bypass selector connected with the output end of the frequency division module, and the first clock bypass selector is further connected with a TX clock gating module, and an output of the TX clock gating module is input to the first clock bypass selector which outputs the TX clock;

the clock generator sub-module further comprises an RX clock generation branch, and the generated RX clock is used as an internal data acquisition clock; and the RX clock generation branch comprises a first RX clock gating module and a second RX clock gating module wherein a phase difference between output signals of the first RX clock gating module and the second RX clock gating module is a master clock period.

2. The FLASH controller for ASIC according to claim 1, wherein the RX clock generation branch further comprises a second frequency division module and a first phase shift selector connected with the output end of the second frequency division module;

the RX clock generation branch further comprises an inverter and a third frequency division module connected with the output end of the inverter, and the output end of the third frequency division module is connected with the first phase shift selector; and the output ends of the first RX clock gating module and the second RX clock gating module are connected with a second phase shift selector; and the output ends of the first phase shift selector and the second phase shift selector are connected with a second clock bypass selector.

3. A control method for the FLASH controller according to claim 1, comprising a working mode of the arbitration module, wherein the working mode of the arbitration module comprises the following three modes:

Mode M4:
when a register is configured as a FLASH XIP mode, the arbitration module enters an idle state of the XIP mode;
if judging that the register is configured for a read operation of FLASH XIP, the arbitration module sends out an active handshaking signal of XIP read operation and enters the XIP read state; a system reads back data corresponding to an address from a read data fifo, and enters the XIP handshaking slave state after the handshake return signal is sent out by the main control module; or
if judging that the register is not configured for a read operation of FLASH XIP, the arbitration module remains in the idle state of the XIP mode;

Mode M5: when a register is configured as a FLASH XIP read-ahead mode, the arbitration module enters the idle state of the XIP mode; if judging that the register is configured for a read-ahead operation of FLASH XIP, the arbitration module sends out an active handshaking signal of XIP read-ahead operation and enters the XIP read-ahead state; a system reads back data from a read data fifo, the controller reads back data corresponding to subsequent addresses from a FLASH device into the read data fifo, and the arbitration module enters the idle state of XIP read-ahead to wait for the next reading of XIP after XIP read-ahead;

the arbitration module judges whether the address transferred by the next read operation of XIP matches with current data, and returns the corresponding data in the read data fifo if the current data matches with the address;

if the current data does matches with the address, the arbitration module enters the address jumping state of XIP, discards the current data, and judges whether next read-ahead data in the read data fifo matches with the current address; if the read-ahead data does not match with the current address, the arbitration module discards unmatched data until the data is read as matching with the current address; if a transfer address exceeds a read-ahead address judging range, the arbitration module re-reads data from FLASH with the transferred address;

if judging that the register is not configured for a write operation of FLASH XIP, the arbitration module remains in the idle state of the XIP mode;

Mode M6: when a register is configured as a FLASH XIP mode, the arbitration module enters the idle state of the XIP mode; if judging that the register is configured for a write operation of FLASH XIP, the arbitration module sends out an active handshaking signal of XIP write operation, and enters the XIP write state; a system saves data into the write data fifo and enters the XIP handshaking slave state after the main control module writes data corresponding to an address and receives a handshaking return signal;

if judging that the register is not configured for a write operation of FLASH XIP, the arbitration module remains in the idle state of the XIP mode;

the control method further comprises a controlling mode of the main control module, where the controlling mode of the main control module comprises the following two modes: after receiving the active handshaking signal from the arbitration module, the main control module enters the handshaking slave state 1 from the idle state, returns to the handshaking response signal of the arbitration module, and then terminates a handshaking process; and the main control module initiates an active handshaking request to the arbitration module, and enters the handshaking master state from the high chip selection state; after receiving the handshaking request, the arbitration module sends out the handshaking response signal, and the main control module receives the handshaking response signal and terminates the handshaking process.

4. The control method according to claim 3, wherein after the main control module terminates the handshaking process, a subsequent control mode further comprises the following modes:

main control mode 1: after realizing data synchronization in the handshaking process, the FLASH device starts to work;

main control mode 2: according to transfer configuration, command data information is converted into an SPI timing interface signal sent in a command period;

main control mode 3: according to transfer configuration, address data information is converted into an SPI timing interface signal sent in an address period;

main control mode 4: according to transfer configuration, extended byte data information is converted into an SPI timing interface signal sent in an extended byte period;

main control model 5: according to transfer configuration, virtual bit data information is converted into an SPI timing interface signal sent in a virtual bit period;

main control mode 6: according to transfer configuration, read data information is converted into an SPI timing interface signal sent in the read data state;

main control mode 7: according to transfer configuration, write data information is converted into an SPI timing interface signal sent in the write data state;

main control mode 8: in the read data state, if cache data received by the main control module from the FLASH device triggers a full threshold in the pre-configured fifo, it indicates further cache data will result in loss of some data; the main control module enters to wait for the FIFO ready state, and continues to send a new SPI instruction after FIFO cache data is ready;

main control mode 9: after waiting for the FIFO ready state, the main control module enters the handshaking slave state 2 to synchronize new data and empty invalid data in the fifo if a new configuration transfer request is made;

main control mode 10: after realizing data transfer, the FLASH device stops operating and terminates FLASH operation; and main control mode 11: after handshaking, the main control module enters the idle state and waits for a new operation instruction.

5. The control method according to claim 3, wherein the working mode of the arbitration module further comprises the following three modes:

Mode M1: when the register is configured as a normal FLASH configuration mode, the arbitration module enters the idle state of a general configuration mode, sends out the active handshaking signal, and enters the general handshaking slave state after the main control module sends configured data and receives the handshaking return signal;

Mode M2: when the register is configured as a normal FLASH configuration mode, the arbitration module enters the idle state of a general data mode; if judging that the register is configured for a read operation of FLASH, the arbitration module sends out an active handshaking signal of read operation, enters the general read state, and waits for the system to read data into a data interface bus in the read data fifo;

after the main control module reads data in the FLASH device and receives the handshaking return signal, the arbitration module enters the general handshaking slave state; if judging that the register is not configured for a general read operation of FLASH, the arbitration module remains in the idle state of the general data mode;

Mode M3: when the register is configured as a normal FLASH configuration mode, the arbitration module enters the idle state of the general data mode; if judging the register is configured for a write operation of FLASH, the arbitration module sends out an active handshaking signal of write operation, enters the general write state, and waits for the system to save data into the write data fifo;

after the main control module writes data and receives the handshaking return signal, the arbitration module enters the general handshaking slave state; if judging that the register is not configured for a general write operation of FLASH, the arbitration module remains in the idle state of the general data mode.

\* \* \* \* \*